United States Patent [19]

Svenning et al.

[11] Patent Number: 5,747,754
[45] Date of Patent: May 5, 1998

[54] METHOD AND APPARATUS FOR TAKING SEISMIC MEASUREMENTS

[75] Inventors: Bjørnar Svenning, Ålgård; Tormod Hals, Trondheim; Bjarne Bugten, Hundhamaren, all of Norway

[73] Assignee: Den Norske Stats Oljeselskap A.S. Stavanger, Norway

[21] Appl. No.: 507,293

[22] PCT Filed: Feb. 21, 1994

[86] PCT No.: PCT/NO94/00043

§ 371 Date: Aug. 24, 1995

§ 102(e) Date: Aug. 24, 1995

[87] PCT Pub. No.: WO94/19707

PCT Pub. Date: Sep. 1, 1994

[30] Foreign Application Priority Data

Feb. 25, 1993 [NO] Norway ................ 930686

[51] Int. Cl.[6] ............ G01V 1/053; G01V 1/047; G01V 1/20; G01V 1/38
[52] U.S. Cl. ............ 181/401; 367/17; 367/165; 367/177; 73/644
[58] Field of Search ............ 367/177, 17, 165, 367/188; 181/401; 73/644

[56] References Cited

U.S. PATENT DOCUMENTS

| | | | |
|---|---|---|---|
| 2,654,077 | 9/1953 | McLoad | 367/188 |
| 3,866,162 | 2/1975 | Florian | 367/177 |
| 3,934,218 | 1/1976 | Babb | 367/177 |
| 4,705,137 | 11/1987 | Fair | 181/401 |
| 5,128,900 | 7/1992 | Cole | 367/75 |

*Primary Examiner*—Nelson Moskowitz
*Attorney, Agent, or Firm*—Foley & Lardner

[57] ABSTRACT

Method and apparatus for carrying out seismic survey includes a plurality of spaced apart seismic detecting sensors each having a geophone unit for detecting seismic activities. The sensors are linked serially with a cable. One end of each geophone unit is flexibly linked to a carrier frame so that the geophone units pivotally move freely relative to the carrier frames. The cable passes through the carrier frames so that the carrier frames are spaced apart serially. Each geophone unit carries a vibrator, a plurality of geophones, a compass, and an inclinometer. The vibrator is positioned on the free end portion of the geophone unit, for embedding the geophone into the ground, while the compass is positioned farthest away from the vibrator. The free pivotal movement of the geophone units enables them to dig into the ground.

18 Claims, 2 Drawing Sheets

METHOD AND APPARATUS FOR TAKING SEISMIC MEASUREMENTS

BACKGROUND

The present invention relates to a method for performing marine seismic surveys by using a cable arranged on the sea bed and comprising geophone units and, the invention relates, moreover, to such a cable adapted for carrying out the stated method.

Use of such cables on the sea bed in the performance of seismic surveys in a marine environment is previously known. In this connection, reference is made to Norwegian printed specification No. 168,610 and U.S. Pat. No. 4,870,625.

From the above publications it is previously known to use a cable that at the time of survey rests on the ocean floor. Such a cable may be provided with geophones as well as hydrophones and, thus, can record both pressure and shear waves that originate from the seismic signals to be detected. A closer description of the survey conditions is given, inter alia, in the two above references.

In practice it has proved to be difficult to obtain a sufficiently good and stable mechanical connection between the geophones and the sea bed while the survey takes place. This may lead to somewhat indefinite detection, in particular of the shear waves that form part of the seismic signals.

The object of the present invention is to provide a method that leads to a more precise recording of the seismic signals than was previously the case, without increasing time consumption during the survey. Further, the object is to provide a simple and efficient cable for the performance of such a method and at the same time avoiding the drawbacks of previously known techniques.

This is obtained by using a method and a cable on the sea bed in accordance with the appended patent claims.

BRIEF DESCRIPTION OF THE DRAWINGS

In order to give a more clear understanding of the present invention, reference is made to the description of the working examples detailed below, as well to as the accompanying drawings, in which.

DETAILED DESCRIPTION

Figure 1:
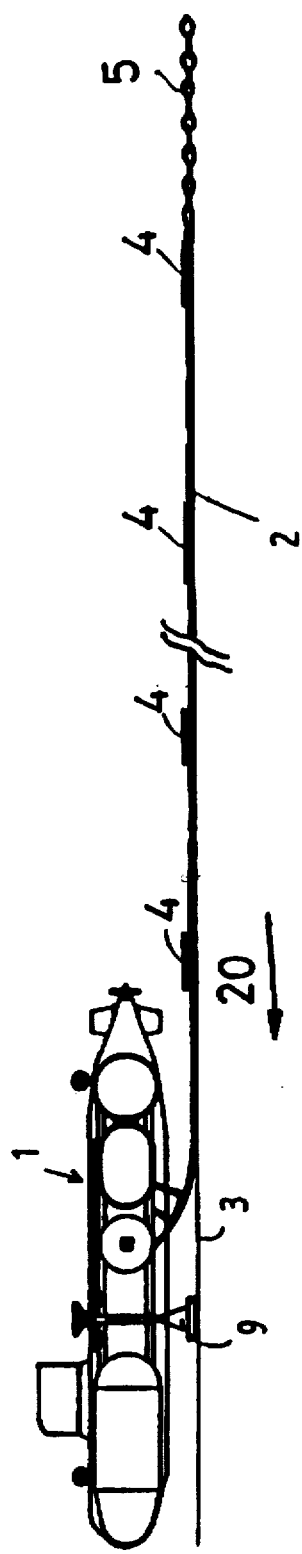
FIG. 1 is a perspective view of how a cable can be disposed on the seabed, for instance by means of a submarine vessel 1.

It is pointed out that the same reference numerals are used in all the figures of drawings that the figures have not been drawn to true scale and that the figures show simplified embodiments of the invention, the simplifications having been carried out in order that the principle of the invention is illustrated in as simple a manner as possible. Finally, it is pointed out that the drawings only show one possible embodiment of the invention, which means that many other embodiments may be contemplated without going beyond the scope of the invention.

FIG. 1 shows how a submarine vessel 1 can tow a cable on the seabed 3. It may be noted that the handling of the cable is, per se, previously known and lies outside the scope of the present invention. Details of such handling are therefore not mentioned here, except that the submarine vessel 1 can be equipped with a seismic source 9. However, the seismic signals can also be generated by separate sources. Likewise, a surface vessel can be used instead of a submarine vessel.

Along the cable 2 itself, which forms part of the cable, sensors 4 are provided that can comprise both geophones and hydrophones. The distribution of the sensors 4 can be regular or irregular along the cable 2, and the cable 2 normally has an extra weight at the end in the form of, for instance, an attached, drag chain 5, which helps to keep the entire length of the cable stretched out. It can also be noted that several such cables can be used in parallel on the sea bed and can then, for instance, be attached to a common transverse pull bar (not shown), which keeps the cables at a constant distance from each other during tansport. As a typical example, the cable can have a length of 1–2 km and be equipped with approximately 100 sensors 4 at intervals of about 10 m.

Under the vessel the cable may well be equipped with a termination box that may contain various electronic circuitry for data transmission. The cable 2 itself must be dimensioned to withstand pressure, cable weight and forces acting during towing. It can advantageously be reinforced with wire of Kevlar or similar materials that endure strong mechanical stress.

The present invention relates in particular to the conditions prevailing during surveys, that is, while the cable lies immobile on the ocean floor. The survey is carried out while the cable lies at rest and when the survey is finished the cable is moved to the next measuring position.

The problem of previously known cables on the sea bed has been that the geophone units, which can either constitute the entire sensor 4 or only a part thereof, do not get sufficiently good and reproducible contact with the sea bed 3 during the survey process. As a consequence the measurement, in particular of seismic shear waves, can be somewhat uncertain, so that the result of such a survey can be misinterpreted.

Figure 2:
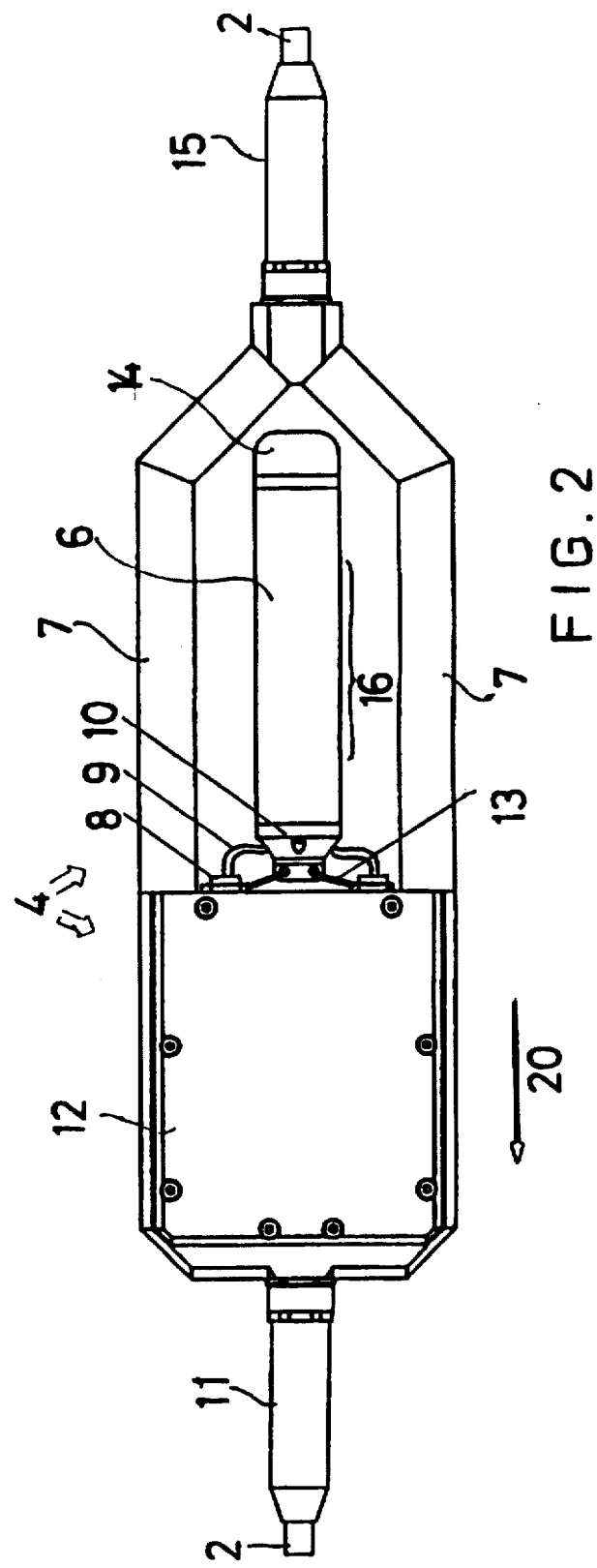
FIG. 2 shows a schematic view of a sensor that can be used in connection with a seabed cable according to FIG. 1.

FIG. 2 shows how the geophone unit 6 is attached to the cable 2. The cable is here seen from above.

The cable 2 contains elements for the transmission of mechanical tension, energy transmission, for instance in the form of electric power, and necessary signal transmission via the cable itself. The cable 2 is next connected to the sensor 4 by means of an intermediate connector 11. The sensor 4, as shown here, consists of two main parts, where the first one is a pressure container 12 for the hydrophone unit. The hydrophone may well be located separately in the box 12 and is protected from the environment. It is adapted to record and later remove reflected signals from the surface. This pressure container 12 can further contain an A/D converter, as well as the necessary processing equipment, for instance including a microprocessor and the necessary memory means.

The second part of the sensor 4 comprises the geophone unit 6 with its flexible connections that may be mechanical, electrical or even hydraulic or pneumatic. It is an advantage that the specific weight of the geophone corresponds to the greatest possible extent to the specific weight of the material of the sea bed (specific gravity approximately 1.7). Moreover, the geophone unit can contain a data unit for signal digitalization and signal amplification. The data unit can also pre-process the data to a certain extent.

It must further be mentioned that the elements that form part of the cable 2 are split into two parts that run internally in a symmetrically arranged frame structure 7 surrounding both the pressure container 12 and the geophone unit 6. The cable 2 is preferably equipped with branches within the frame structure 7 for the necessary connections to the hydrophone unit in the pressure container 12 as well as to the geophone unit 6. Further the cable 2 continues to the right through a new connector 15 and further leads via the next cable section 2 to the next sensor that preferably is of the same type as the one illustrated here, but which can also be of a somewhat different type.

The most important feature of the present invention is, in addition to the frame structure 7 and its protective envelopment of the cable and the screening of the recording and sensitive elements of the sensor unit, the design of the geophone unit 6 itself.

Figure 3:
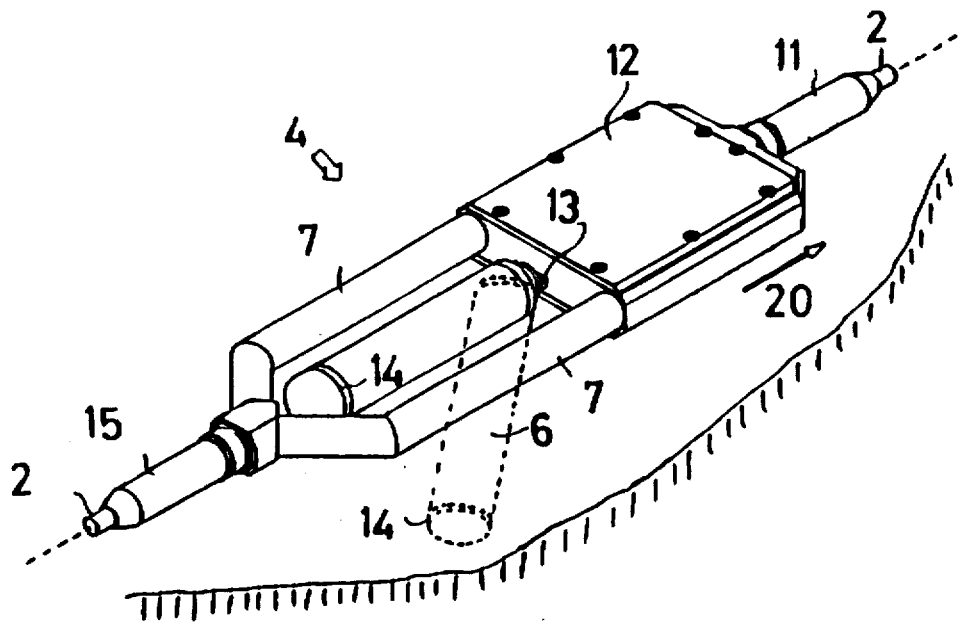
FIG. 3 shows a sensor according to FIG. 2, but here shown in perspective view.
Figure 4:
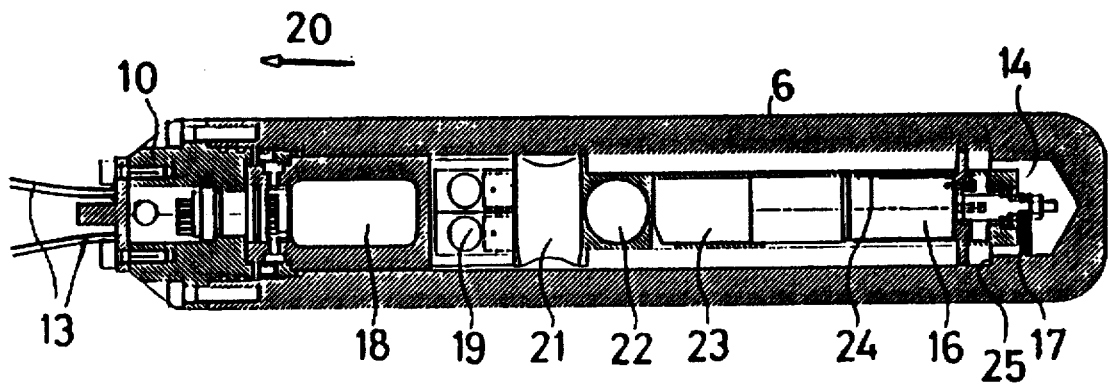
FIG. 4 shows more in detail the construction of the geophone unit forming part of a sensor.

As appears from FIGS. 2, 3 and 4 the geophone unit 6 is shaped as an elongated, cylindrical unit. It is only attached to the cable 2 via a pressure container 12 and a frame structure 7 by means of flexible joints 8, 9, 10 of different types, all preferably located at the same end of the geophone unit. The figure shows a connector 8, a flexible group of cables 9 and a combined cap and connector 10 that leads to the active parts of the geophone unit 6. Altogether this connection can be mechanically ensured by a flexible suspension 13 and the construction of all these components must of course be adapted to the cable construction in question, and the actual construction of the geophone unit. The most important condition is that there is a flexible connection that allows the geophone unit 6 to move, within certain limitations, in all co-ordinate directions in relation to the frame structure 7. Thus, the suspension does not obstruct movement in direction X, Y or Z, nor does it obstruct a limited rotation of the geophone unit 6. If all the connection joints 8, 9, 10, 13 are located close to each other at one end of the geophone unit 6, the geophone is also allowed to tilt transversely to the axis of the frame structure and the cable.

When the cable with its sensors is towed along the ocean floor, this is done in the direction of the arrow 20 as shown in the figure. When the cable 2 lies at rest the geophone unit 6 will also lie at rest within the frame structure 7, however the purely local positioning of the geophone unit on the ocean floor will depend on the topography of the immediate location. It may well happen, therefore, that the geophone unit 6 assumes an unstable position on a stone or the like, or the geophone unit 6 may lie on a soft, organic material, which gives a poor mechanical connection between the geophone unit and the ocean floor 3 beneath.

In order that the geophone unit 6 have best possible mechanical contact with the sea bed 3 a vibrator 14 is provided at the free end of the geophone unit 6. As soon as the cable 2 is put to rest on the ocean floor 3, the vibrator 14, being powered through the cable 2, is put into operation which in part will result in geophone unit 6 being shaken into a suitable position on the ocean floor 3 and in part result in the geophone unit's 6 more or less sinking down into the ocean floor 3. This is of course dependent on the general character of the ocean floor, but nevertheless the mechanical connection between the geophone unit 6 and the ocena floor 3 will be substantially stronger than in previous solutions.

The vibrator 14, which preferably is located at the free end of the geophone unit 6, can be constructed in many ways and can be powered by different means. In a preferred embodiment best shown in FIG. 4, the vibrator 14 comprises an electrically or hydraulically run rotating motor 16 equipped with an eccentric balance wheel with an assymmetric weight 17. If the motor is electric, it should be surrounded by magnetic screening 24 in order not to influence the compass, and should moreover be located at a distance as far as possible from it. The balance wheel is enclosed in the geophone unit itself. When the eccentric balance wheel rotates at great speed, this will entail that the free end of the geophone unit 6 will seek to move rapidly with small circular movements. It is therefore an advantage that the eccentric balance wheel is located at the part of the geophone unit 6 having the greatest freedom of movement. If the environment is not too rigid the particles near the geophone unit 6 will be pushed aside and the geophone unit 6 will bury itself in mud and particles on the floor 3, and form good mechanical connection with it, so that the seismic signals in the form of shear waves that move through, and partly are reflected by, supporting formations, will be transferred to the three geophones 21, 22, 23 located inside the geophone unit 6, after the balance wheel with its mechanical eccentricity 17 has stopped, so that the vibrations have ceased and the geophone unit 6 has stationed itself in the survey position.

Advantageously, the vibrator 14 can be maintained in the correct position against the interior of the housing, for instance by means of a shoulder 25.

The design of the geophone itself and the recording of data have not been stated more closely, since known techniques are used here.

In FIG. 3 the burying of the geophone unit 6 due to the vibration is shown in more detail as the sensor 4 is shown in a perspective view. The dotted lines show which position that the geophone unit 6 can assume after the vibration phase is ended and the survey is to begin. Since the geophone unit 6 preferably contains three geophones 21, 22, 23 that record signals in three ortogonal directions, as well as a three dimensional compass 18 and inclinometer 19, the received signals can be associated with a determined reference network of co-ordinates and give unambiguous signals no matter which, position and orientation each individual geophone unit 6 adopts in space. Likewise the attachment via the flexible suspension 13, as well as the cylindrical surface of the geophone unit, will mean that the geophone unit 6 is easily towed away when the cable, after the concluded survey, is towed in the direction indicated by the arrow 20.

Many different modifications of the present invention can be contemplated. Thus, the vibrator 14 can be designed in other ways than described above. It may for instance be designed as a linear piston that is moved back and forth and thereby vibrates the geophone unit in one plane only. If such a linear piston is located in the same direction as the axis of the geophone unit, the vibration can also be executed in the axial direction. A combination of several different vibration generators is also comprised by the scope of the present invention. An unbalanced rotation motor as shown in FIG. 4 can also be equipped with, for instance, an arrangement that yields abrupt, axial stroke movements similar to the arrangement in a percussion drill. Likewise it must be pointed out that the vibrators can be driven both electrically, hydraulically and/or pneumatically. The geophone unit 6 is preferably designed in such a manner that it obtains approximately the same specific weight as the material on the ocean floor, most often about 1.7 or in any case between 1.5 and 2.0. Likewise the mass in the vibrator itself can constitute a relatively large portion, for instance up to about 10% of the mass of the geophone unit, so that sufficient force is obtained during vibration. Likewise the choice of material for the geophone unit 6 can be of a certain importance for the ability of the unit to dig itself down into the sea bed 3. It is, however, preferred that the geophone unit 6 has a rough or even uneven surface, so that when it has obtained good mechanical contact with the particles in the environment it no longer moves easily in relation to these. The orientation of the geophone unit after ended vibration can be detected by the inclinometer and the compass.

The frequency at which the vibrator operates can vary within wide limits. As an example it can be mentioned that the frequency can lie between 50 and 150 Hz. However, lower frequencies can also be contemplated. In particular environmental conditions some specific frequencies can be advantageous. Further, it can be mentioned that the frequency can vary in a controlled manner. When a vibrator with rotating eccentricity is used, the vibrator can thus be started with a low but increasing rotational speed and be maintained at maximum r.p.m. for a predetermined period before the rotational speed is reduced again before it stops. Any progression of the vibrational frequency thus lies within the scope of the present invention.

The geophone unit can also be equipped with more than one vibrator and the different vibrators can vibrate on different planes and/or along different axes and vibrate at different or similar frequencies and amplitudes.

It shall be noted that the cable on the sea bed can also with advantage comprise hydrophone units that then can with advantage be placed in the pressure container 12. The pressure container 12 can also contain a data unit for signal digitalization and signal amplification. Such a data unit can also process the acquired data and intermediately store them and/or transmit them. The frame structure 7 can consist of metal and can be welded to the pressure container 12 so that the cable elements from the cable 2 can be divided in two groups each passing through its own side of the frame structure and having branches leading into the pressure container 12 to be connected by the suitable connections to the compass 18, the inclinometer 19, the geophones 21, 22 and 23 as well as the motor 16. If the sea bed cable is equipped with a hydrophone, this must also be connected to the correct elements in the cable. This connection is then preferably established directly via the connector 11. Finally, the geophone unit can have other geometrical shapes, the cross-section may for instance be oval or polygonal.

We claim:

1. A method of taking seismic measurements comprising the steps of:
   providing a plurality of spaced apart seismic detecting sensors, each having a geophone unit, which carries at least one geophone for detecting seismic activities;
   flexibly suspending one end of each geophone unit to a carrier frame so that the geophone units are substantially pivotally movable relative to the carrier frames;
   serially spacing and linking the carrier frames with a power supplying cable;
   resting the carrier frames on a desired location of a floor covered with water;
   vibrating the geophone units, wherein the flexible suspension of the geophone units relative to the carriers enables free ends of the geophone units to embed into the floor;
   ceasing the vibration to maintain the geophone units stationary and partly embedded in the floor; and
   measuring the seismic activities thereafter.

2. A method according to claim 1, wherein the geophone units are each vibrated in at least one plane or along at least one direction, the frequency of the vibrations is variable and controllable.

3. A method according to claim 2, wherein the suspended geophone units have a substantially cylindrical geometry and are vibrated substantially at the free ends thereof, which have the greatest degree of movement.

4. A method according to claim 3, wherein a specific gravity of each suspended geophone unit ranges from about 1.5 to about 2.0.

5. A method according to claim 1, wherein the each geophone unit is positioned between a pair of opposing frame members, which form the carrier frame.

6. A seismic detecting device comprising:
   a plurality of spaced apart seismic detecting sensors, each having a geophone unit adapted to detect seismic activities and adapted to rest on or in a ground covered with water,
   wherein the sensors each have a carrier frame carrying the geophone unit, the geophone unit being flexibly connected at one end thereof to the respective carrier frame so that the geophone unit is movable, substantially pivotally, relative to the carrier frame, and
   wherein each of the geophone units carries a vibrator for vibratingly embedding the geophone unit into the ground and at least one geophone for detecting vibration; and
   a cable passing through the carrier frames and serially connecting the carrier frames, the cable providing power for the vibrator.

7. A seismic detecting device according to claim 6, wherein each of the geophone units has a substantially cylindrical geometry and the vibrator of each geophone unit is adapted to vibrate the free end of the respective cylindrical geophone unit, which free end has the greatest degree of movement.

8. A seismic detecting device according to claim 6, wherein a specific gravity of each suspended geophone unit is adapted to be same as the ground.

9. A seismic detecting device according to claim 8, wherein the specific gravity of each suspended geophone unit ranges from about 1.5 to about 2.0.

10. A seismic detecting device according to claim 6, wherein the carrier frame comprises a pair of opposing frame members and the geophone unit is suspended between the frame members.

11. A seismic detecting device according to claim 7, wherein each geophone unit has a flexible connection that connects the geophone unit to the carrier frame and includes a plurality of geophones, a compass, and an inclinometer, and at least one vibrator positioned substantially at the free end of the geophone unit, the vibrator being adapted to vibrate the geophone unit in at least one plane or along at least one axis.

12. A seismic detecting device according to claim 11, wherein the vibrator comprises a rotating or reciprocating motor with an asymmetric weight, the motor being powered through the flexible connection and the cable.

13. A seismic detecting device according to claims 12, wherein the motor is electrically driven.

14. A seismic detecting device according to claim 12, wherein the motor is hydraulically or pneumatically driven.

15. A seismic detecting sensor adapted for detecting seismic activities comprising:
   a carrier frame adapted to pass a power supplying cable therethrough; and a geophone unit flexibly connected to the carrier frame to enable the geophone unit to move, substantially pivotally, relative to the carrier frame, wherein the geophone unit carries at least one geophone for detecting vibration and a vibrator for vibratingly embedding the geophone unit into a ground covered with water, and wherein a specific gravity of the geophone unit is adapted to be the same as the ground under water.

16. A seismic detecting sensor according to claim 15, wherein the specific gravity of the geophone unit ranges from about 1.5 to about 2.0.

17. A seismic detecting sensor according to claim 15, wherein the carrier frame comprises a pair of opposing frame members and the geophone unit is suspended between the frame members.

18. A seismic detecting sensor adapted for detecting seismic activities comprising:

a carrier frame adapted to pass a power supplying cable therethrough; and a geophone unit flexibly connected to the carrier frame to enable the geophone unit to move, substantially pivotally, relative to the carrier frame, wherein the geophone unit carries at least one geophone for detecting vibration and a vibrator for vibratingly embedding the geophone unit into a ground covered with water, wherein the geophone unit has a substantially cylindrical geometry and is connected at one end to the carrier frame, and the vibrator is adapted to vibrate the free end of the respective cylindrical geophone unit, which free end has the greatest degree of movement, wherein a flexible connector connects the one end of the geophone unit to the carrier frame, wherein the geophone unit includes three geophones for detecting vibrations in three coordinates, a compass, and an inclinometer, the vibrator being positioned substantially at the free end of the geophone unit, the vibrator being adapted to vibrate the geophone unit in at least one plane or along at least one axis, and wherein the vibrator comprises a rotating or reciprocating motor with an asymmetric weight, the motor being powered through the flexible connection.

\* \* \* \* \*